Patented Dec. 17, 1929

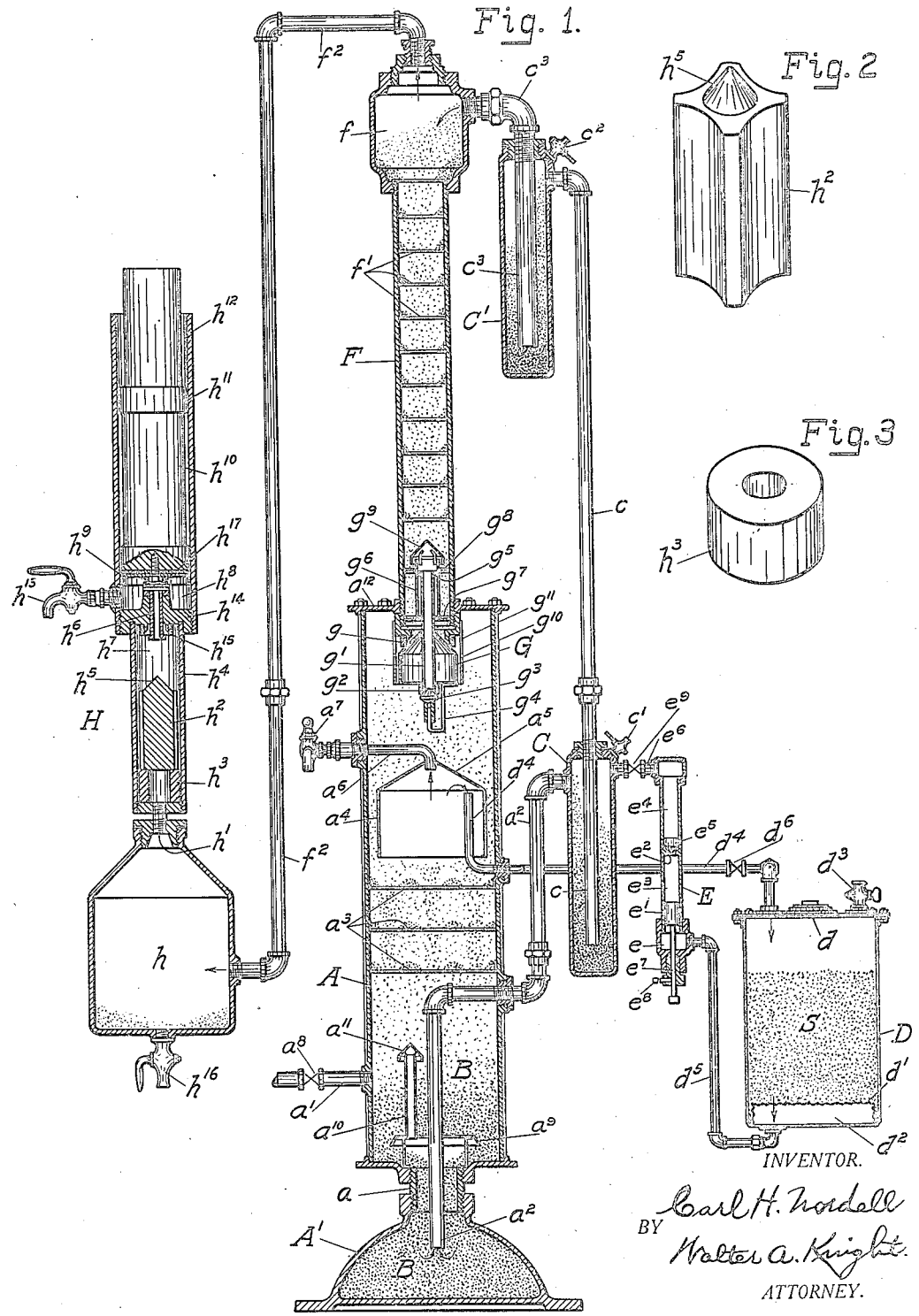

1,740,199

UNITED STATES PATENT OFFICE

CARL H. NORDELL, OF FORT WAYNE, INDIANA, ASSIGNOR TO THE PERMUTIT COMPANY, A CORPORATION OF DELAWARE

METHOD OF AND APPARATUS FOR THE CONTINUOUS SOFTENING OF WATER

Application filed May 15, 1922. Serial No. 561,095.

My invention relates to a method of and apparatus for the continuous softening of water by the use of zeolites. The word zeolites is herein used to include hydrated alumina silicates or any other material having base exchange properties. These base exchange silicates are generally spoken of herein as the mineral.

This invention shows another form of apparatus adapted to accomplish the purpose of the invention set forth in my co-pending application, which matured into Patent No. 1,608,661; and a method subordinate to the one disclosed therein.

In the apparatus of the present invention the zeolites are circulated progressively through a water softening chamber in the main casing, one or more zeolite regenerating chambers outside the main casing and a separate zeolite washing chamber and then back into the main casing.

One object of this invention is in turn to separate the softened water from the zeolites, the brine from the zeolites and the wash water from the zeolites, without the use of screens.

Another object of my invention is to afford exact means of measuring the brine delivered to the regenerating chamber, resulting in better regulation of salt consumption.

Another object of my invention is to expel from a lower portion of the bed of zeolites in a water softening chamber charges of zeolites substantially just sufficiently fluid to flow.

Another object of my invention is to advance through the apparatus substantially uniform charges of zeolites from each chamber to the next succeeding one; and means for determining and fixing the frequency of these charges at will.

Another object of my invention is to provide means for re-mixing water and zeolites where the latter travel through pipes under pressure so that the mixture shall remain sufficiently fluid to be readily advanced to complete the cycle.

Washing and softening are counter-flow operations, the purpose being briefly explained as follows:—

The hard water to be softened enters the main casing near the bottom and flows upwardly through a loose lying constantly descending bed of zeolites and then through a rain of descending zeolites, thus bringing the hardest water into contact with the most nearly exhausted mineral, then into contact with that of increasingly greater vitality and finally the nearly soft water into contact with the freshly reconditioned zeolites, effecting complete softening. This flowing of the water so that the hardest water contacts with the most nearly spent mineral and progressively the water less hard contacts with mineral of progressively greater vitality is one object of my invention:—

The wash water enters the washing chamber from the bottom and flows upwardly through a heavy rain of descending zeolites, thus bringing the perfectly fresh water into contact with the mineral most nearly freed of brine and progressively bringing the water increasingly contaminated by salt into contact with mineral of progressively increasing brine content.

Another object of my invention is to provide means for preventing brine and briny zeolites from being washed back into the main or softening casing.

My invention is illustrated in the accompanying drawings, in which;—

Figure 1, shows in vertical axial section a complete automatic continuous water softening apparatus of the pressure type, Fig. 2, a detail, is an enlarged perspective of the poppet slug, and Fig. 3, a detail, is an enlarged perspective of the ring slug.

Referring now to the drawings, A is the main casing or tank in which the water-softening operation takes place, connected by a throat $a$ to a hollow base $A^1$. This throat is shielded by a guard, $a^9$ to prevent the zeolites from choking up the throat $a$, and becoming so tightly packed as to prevent circulation of the mineral. The guard $a^9$ is provided with a breather pipe $a^{10}$, having a conical top $a^{11}$ to keep the zeolites from falling into said pipe. The hard water to be softened enters the casing A through the pipe $a^1$. A loose lying bed of zeolites B normally fills the lower part of the casing A and the base $A^1$ and substantially uniform charges thereof are withdrawn from the base through the pipe $a^2$. I prefer to use one or more perforated plates $a^3$, arranged horizontally across the casing A, to break and retard the fall of the zeolites descending in a rain through the casing. An inverted cylindrical cup $a^4$ preferably made with its closed end $a^5$, conical to cause the mineral to slide off and continue its descent, forms a bell in which the softened water collects and completes its separation from the zeolites and from which it passes off to service through the pipe $a^6$, controlled by the cock $a^7$.

The zeolites withdrawal pipe $a^2$ passes through the side of the casing A and then upwardly, entering a regenerating chamber C, near its top.

A salt pot D, is kept partially filled with common salt, S, through the charging hole $d$, and has a chamber $d^2$, at the bottom formed by the screen $d^1$. A pet-cock $d^3$ is provided as a vent. Water (preferably soft as shown herein) is fed to the upper part of the salt pot D, from within the casing A, through the pipe $d^4$. The water fed into the top of the salt-pot D, passes downwardly through the body of salt S, and enters the strainer chamber $d^2$, as saturated brine. Thence it flows through the pipe $d^5$, into the chamber $e$ of the brine feeder E, raising the loose fitting brine piston $e^1$, until it strikes against the valve seat $e^2$, forcing the body of brine in the chamber $e^3$, through the upper chamber $e^4$ and the pipe $e^6$ into the chamber C by lifting the check valve $e^5$ which fits loosely in the chamber $e^4$. When the mineral comes to rest in the chamber C, the check valve $e^5$ seats, preventing back flow of the brine; the piston $e^1$ falls, the brine passing around it into the chamber $e^3$. A rod $e^7$ may be adjusted by the set screw $e^8$ to limit the descent of the piston $e^1$, thus regulating the quantity of brine admitted to the brine feeder at one charge, a like quantity being discharged into the regenerating chamber C, during the admission of each charge of mineral to the chamber C.

Mineral passes from the chamber C through the pipe $c$ into a secondary regenerating chamber $C^1$ near its top and is there subjected to further contact with the brine carried up with the zeolites. The chambers C and $C^1$ have air valves, $c^1$ and $c^2$, respectively, to discharge trapped air when the apparatus is first put into operation. In these chambers the zeolites are mixed with brine maintaining a mixture sufficiently fluid to flow freely as successive charges are advanced.

It will be seen that each regenerating chamber with its entrance orifice near the top and its exit orifice near the bottom constitutes an effective trap, preventing the back-flow of zeolites and liquid into the preceding chamber. Entrapped air will be carried out along with charges of zeolites and liquid after the apparatus is in full operation.

Regenerated mineral passes from the chamber $C^1$ through the pipe $c^3$ into the separation chamber $f$ which forms the top of the washing chamber F. A series of perforated or ring baffle plates $f^1$ retards the fall of the zeolites which are further retarded by the upward flow of the wash water through the chamber F.

When a charge of mineral is being drawn into the regeneration chamber C, another charge is being forwarded to the secondary regenerating chamber $C^1$, and another charge is being delivered into the washing chamber F, through which it falls, coming to rest on top of the float poppet valve G, which has a seat $g$, preferably of rubber or other resilient material. The valve G has an axial tube $g^1$ integral with the body, the lower end of said tube carrying a seat $g^2$, preferably of resilient material, and adapted to be closed by the force of the upwardly rushing water acting on the secondary poppet valve $g^3$ whose stem is bored axially to receive the valve rod $g^4$, fixed to the valve G. The valve $g^3$ is adapted to rise and fall on the valve rod $g^4$. The upper part of the tube $g^1$ carries guides $g^5$ adapted to maintain alignment of the valve G and its tube $g^1$ by contacting with the interior of the guide tube $g^6$ secured to the spiders $g^7$ and $g^8$, and fitted with a conical top $g^9$ to keep the falling zeolites out of the guide tube. The valve G is further guided by the cylindrical shell $g^{10}$, held to the head $a^{12}$ of the casing A by supports $g^{11}$.

When the pressures in the chambers A and F are equalized, the valve $g^3$ falls by gravity, the valve G falls because of the weight of accumulated mineral thereon, and soft water from the top of the casing A flows into the washing chamber F through the tube $g^1$ and out under the conical top $g^9$, thence upwardly through falling zeolites in the washing chamber and the separation chamber $f$ where the wash water in conjunction with the spent brine carried over from the secondary regeneration chamber $C^1$, passes out into the pipe $f^2$. This completes the circuit of the zeolites from the base $A^1$, around thru C, $C^1$ and F to the top of the casing A, thence it gradually falls by gravity back to the base $A^1$ as mineral is withdrawn from said base.

The wash water and spent brine enter the sediment chamber $h$ of the control valve H and flows upwardly through the opening $h^1$ forcing the poppet slug $h^2$, the ring slug $h^3$ (which two in combination form a rather loose fitting piston in the tube $h^4$) until the apex $h^5$ of the slug strikes the pusher pin $h^6$, seated axially so as to afford limited vertical movement in the head $h^{14}$. The rising piston, $h^2$—$h^3$, forces the water above it in the chamber $h^7$, through the opening in the pusher pin into the chamber $h^8$ forcing upwardly the weighted piston, composed of the cup leather $h^9$ and the weight $h^{10}$, guided at $h^{11}$ in the tube $h^{12}$. The outlet $h^{13}$, which is always open, is arranged to take a predetermined longer time to let out the water in the chamber $h^8$, than it takes to let it in through the pusher pin $h^6$. This differential allows the weighted piston to be raised by the force of the water until the slug $h^2$, pushes up the pusher pin $h^6$ and seats itself against the seat $h^{15}$, preferably resilient, on the under side of the head $h^{14}$. As soon as the poppet slug $h^2$ seats, the upward flow of water stops, and the ring-slug $h^3$ falls by gravity.

This closing of the opening between the chambers $h^7$ and $h^8$ stops the flow of waste wash water from chamber $f$ and the withdrawal of mineral from chamber $A^1$ to chamber C.

When the valve $h^2$—$h^3$ has seated the weighted piston stops rising and as the water discharges through the cock $h^{13}$ and the weighted piston gradually descends, the spring $h^{17}$ fixed to the under side of said piston presses on the pusher pin with sufficient force to dislodge the slug $h^2$ from its seat allowing water to flow around slug $h^2$ into chamber $h^7$ and slug $h^2$ falls into contact with the ring slug $h^3$ sealing off the opening in the ring slug so that the two in combination form a piston and will rise together as hereinbefore described. The cock $h^{16}$ is provided to draw off worn out zeolites and other sediment from the apparatus.

As the apparatus is a leak tight system when, and so long as, the piston $h^2$—$h^3$ rises, the wash water and spent brine is drawn from the chamber $f$ of F into the chamber $h$; the space occupied by the water taken from chamber F is filled by zeolites and spent brine from the secondary regenerating chamber $C^1$; the space occupied by zeolites and spent brine passed from chamber $C^1$, is filled by zeolites and partly spent brine from chamber C; and the space occupied by brine and zeolites taken from chamber C is filled by zeolites and water from casing $A^1$, and brine from saltpot D. The mineral passed into chamber F passes into casing A and a volume of water equal to the true volume of zeolites passes from A into F to fill the space formerly occupied by the zeolites. These movements of the contents of the apparatus are the successive steps, that progressively repeated, constitute the cycle required to carry my invention into effect.

Valves $a^8$, $d^6$ and $e^9$ are provided for use when the apparatus is to be thrown out of service, and the last two for use in recharging the pot D with salt.

I do not limit myself to the apparatus herein illustrated and described, but conceive as within the scope of my invention, any method of softening water continuously by the use of zeolites and apparatus for carrying the same into effect that fall within the scope of the claims that may be ultimately allowed hereon.

The operation of the apparatus is as follows:

The control valve H opens and relieves the pressure in the washing chamber F. This causes the valve "G" to close and a charge of spent zeolites to be forced by the pressure of water in the water softening chamber A from the spent zeolite chamber B to the regenerating chamber C and a like charge of partially or wholly regenerated zeolites from the chamber C to the chamber $C^1$, and a like charge of the regenerated zeolites to be forced simultaneously from the chamber $C^1$ into the washing chamber F. Simultaneously with the admission of the charge of spent zeolites into the chambers C and $C^1$ a charge of brine is forced into the chamber C by the superior pressure in the chamber A acting thru the salt tank D, the amount of the charge of brine so fed being regulated by the adjustment of the feeder device E.

The control valve then closes and pressures are equalized in chambers F and A allowing the valve G to open and the regenerated zeolites to drop from chamber F into chamber A. Water from chamber A simultaneously ascends into the chamber F to take the place of said falling zeolites, and this water flows against the stream of descending zeolites thereby washing them free of spent brine. Said spent brine and wash water accumulate near the top of chamber F until discharged therefrom at the next opening of the control valve.

This cycle of events maintains the zeolites in the chamber A in condition to completely soften hard water at all times when and as said water is admitted thru pipe $a^1$, the soft water being withdrawn thru pipe $a^6$.

I claim as my invention and desire to secure by Letters Patent of the United States:—

1. A method of softening water, consisting of passing water to be softened, upwardly, through a descending shower of zeolites.

2. A method of softening water, consisting of passing water to be softened, upwardly, through a loose lying bed of downwardly moving zeolites.

3. A method of continuously softening water by the use of zeolites, consisting of three constantly repeated automatic steps; the first, passing water to be softened, upwardly, through a portion of the zeolites that are vivified, while same are moving downwardly; the second, passing through brine another portion of the zeolites, that are substantially exhausted; and the third, passing wash-water, upwardly, through another portion of zeolites that have been so regenerated and are being returned, downwardly, for further use in water softening.

4. The method of constantly maintaining the water softening efficacy of a substantial portion of the zeolites in a water softening apparatus, while said apparatus is in service, consisting of repeatedly or continuously withdrawing zeolites from the portion already used for water softening, passing said zeolites so withdrawn through brine and after they have been so regenerated washing them by dropping them through upwardly moving wash water, back into place for further use in softening water.

5. The method of softening water, consisting of circulating zeolites part at a time through a water softening chamber, a separate zeolite regenerating chamber, and a regenerated zeolite washing chamber, furnishing hard water to be softened to the softening chamber, brine to the regenerating chamber, intermittently, and wash water to the washing chamber, intermittently, the forwarding of successive charges of said zeolites being automatically regulated.

6. The method of circulating zeolites for use in softening water, utilizing the pressure of the water entering in the softening compartment to force the zeolites mixed with fluid from at or near the bottom of the softening compartment thru regenerating and washing compartments consecutively back to the top of the softening compartment, by intermittently opening the washing compartment to momentarily relieve of pressure the washing and regenerating compartments.

7. The method of intermittently circulating zeolites in a system, consisting of passing the zeolites by gravity from the high point to a low point in said system and by the force of the pressure of fluid in the system from a low point to the high point again.

8. The method of circulating zeolites for use in softening water; which consists in dropping regenerated zeolites by gravity thru the water to be softened within the water softening chamber, intermittently raising exhausted zeolites thru one or more regenerating chambers by utilizing the pressure of fluid flowing within the system, intermittently supplying regenerated zeolites to a washing chamber so that they will pass by gravity thru the wash water, and returning said reconditioned zeolites intermittently to the water softening chamber.

9. An apparatus for softening water with zeolites, comprising a receptacle for zeolites, means for feeding zeolites in condition for softening water into an upper part of said receptacle while the apparatus is in use and allowing them to fall by gravity therethru and means for flowing the water to be softened upwardly within said receptacle thru said downwardly moving zeolites.

10. An apparatus for softening water with zeolites, comprising a receptacle for zeolites, means for feeding zeolites in condition for softening water into an upper part of said receptacle while the apparatus is in use so that they will fall by gravity and form a loose lying bed of downwardly moving zeolites therein, and means for flowing the water to be softened upwardly thru said bed of zeolites.

11. In an apparatus for softening water with zeolites, means for intermittently dropping reconditioned zeolites thru a restricted passage into the water softening receptacle filled with zeolites and water, causing water displaced by the falling zeolites to flow from said receptacle upwardly; effecting an upward flow of wash water counter to the downward movement of zeolites.

12. In an apparatus for softening water with zeolites, a closed system within which water is softened, zeolites are regenerated and regenerated zeolites are washed, means for intermittently circulating zeolites thru said system by passing zeolites by gravity from the high point to a low point of said system, and means for intermittently forcing zeolites from a low point to the high point of said system again, by the potential energy of fluid in the system.

13. An apparatus for softening water with zeolites comprising a connected system having a chamber within which water is softened, vivified zeolites for softening water in said chamber, another chamber or chambers within which zeolites are regenerated, another chamber within which zeolites are washed after being regenerated, and means for forwarding a charge of substantially exhausted zeolites from the first named chamber to the second named chamber or chambers, and for forwarding another charge of regenerated zeolites from the second named chamber or chambers to the third named chamber, the washed zeolites falling by gravity from the third named chamber to the first named chamber.

14. In an apparatus within which the zeolites are repeatedly circulated by the force of flowing water, the combination of a main reaction container within which the zeolites fall by gravity, a separate secondary reaction container, a fluid connection between said containers, a washing container thru which the zeolites fall by gravity back into the main reaction container, a fluid connection between the second reaction container and the washing container and a fluid connection between the washing container and the main reaction container.

15. An apparatus for softening water having in combination a water softening chamber, one or more zeolite regenerating chambers and a regenerated zeolite washing chamber, with means for intermittently forwarding substantially exhausted zeolites from a lower part of the softening chamber to the zeolite regenerating chamber or chambers, thence intermittently to the regenerated zeolite washing chamber, both by the pressure of the liquid flowing in the system; and means for intermittently passing reconditioned zeolites from said washing chamber to said softening chamber, thence through the water to be softened, both by gravity; the operation being continuously repeated.

16. An apparatus for softening water having in combination a water softening chamber, one or more zeolite regenerating chambers and a regenerated zeolite washing chamber, with means for intermittently passing a charge of substantially exhausted zeolites from a lower part of the softening chamber to the zeolite regenerating chamber or chambers, thence intermittently to the regenerated zeolite washing chamber, both by the force of the liquid flowing in the system, means for intermittently passing reconditioned zeolites from said washing chamber to said softening chamber, thence through the water to be softened, both by gravity, the operation being continuously repeated; means for fixing the quantity of zeolites so passed at each charge and means for varying the frequency of the passing of the charge.

17. In an apparatus, within which zeolites are repeatedly circulated automatically the combination of a chamber within which the liquid to be treated is passed through reconditioned zeolites, a chamber or chambers within which substantially exhausted zeolites are brought into contact with a regenerating agent, a chamber within which regenerated zeolites are washed, means for intermittently dropping reconditioned zeolites through a restricted passage from the washing chamber into the treatment chamber, means for intermittently forcing said zeolites from a low point of the treatment chamber to a regenerating chamber, means for intermittently supplying the regenerating agent to said regenerating chamber, means for intermittently passing a quantity of regenerated zeolites from a regenerating chamber to the washing chamber and a regulating valve automatically operated by the force of flowing liquid for causing and controlling all said intermittent flows.

18. An apparatus for softening water by the use of zeolites; consisting of a softening chamber within which is maintained a quantity of zeolites of water softening efficacy and a lower portion into which substantially exhausted zeolites fall, means for supplying water to be softened to said zeolites, means for withdrawing soft water from said chamber, a conduit adapted to have successive charges of exhausted zeolites mixed with water passed thru it from the lower portion of the softening chamber to a chamber within which zeolites are regenerated, a regenerating chamber, means for supplying a regenerating chamber, means for supplying a regenerating fluid to said regenerating chamber, a conduit adapted to have successive charges of regenerated zeolites mixed with brine passed thru it from the regenerating chamber to a washing chamber, said washing chamber connected to an upper part of the softening chamber, automatic means for intermittently opening and closing the washing chamber to atmospheric pressure, and valve means for closing the opening between the washing chamber and the softening chamber at such times as the washing chamber is open to atmospheric pressure, causing the pressure in the softening chamber to advance a charge of exhausted zeolites from the base of the softening chamber into the regenerating chamber and another charge of regenerated zeolites from the regenerating chamber into the zeolite washing chamber, said valve means opening the washing chamber to the softening chamber at such times as the washing chamber opening to atmosphere is closed and the pressure within the washing chamber, zeolite regenerating chamber and conduits is substantially the same as that within the softening chamber, allowing the zeolites to fall by gravity from the washing chamber into the softening chamber and water from the softening chamber to pass into the washing chamber to take the place of said zeolites.

19. In combination with a water softening apparatus of the character indicated, a separate zeolite regenerating chamber, means for admitting substantially exhausted zeolites and water to said chamber near its top, and means for emitting regenerated zeolites and spent regenerating liquid from near the bottom of said chamber.

20. The method of circulating wet zeolites in a water softening apparatus, which consists of utilizing the pressure of the water in the chamber above the bedded mass of zeolites to be circulated, in such a way as to expel a mass of wet zeolites just sufficiently fluid to flow.

21. An apparatus for softening water with zeolites, having in combination a receptacle for zeolites within which water softening takes place, a washing receptacle mounted upon said softening receptacle, a salt tank, a fluid connection from the softening receptacle to said salt tank, one or more regenerating receptacles, means for conveying brine from said salt tank to a regenerating receptacle, means for regulating the quantity of brine so conveyed, a fluid connection between the final regenerating receptacle and the washing receptacle; and unitary means for regulating both the discharge of spent brine and wash water, and the circulation of the zeolites in successive charges from the water softening receptacle to the regenerating receptacle, from the regenerating receptacle to the washing receptacle, and from the washing receptacle to the water softening receptacle again.

22. An apparatus for softening water with zeolites, having in combination a receptacle for zeolites within which water softening takes place, a washing receptacle mounted upon said softening receptacle, a salt tank, a fluid connection from the softening receptacle to said salt tank, one or more regenerating receptacles, means for conveying brine from said salt tank to a regenerating receptacle, means for regulating the quantity of brine so conveyed, a fluid connection between the final regenerating receptacle and the washing receptacle; and a control valve for regulating both the discharge of spent brine and wash water, and the circulation of the zeolites in successive charges from the water softening receptacle to the regenerating receptacle, from the regenerating receptacle to the washing receptacle, and from the washing receptacle to the water softening receptacle again.

23. The process of using and regenerating a base exchanging substance, which consists in utilizing the zeolite in a closed filtering compartment for the purpose of exchanging base with foreign matter in the liquid passed through the base exchanging substance, in transferring the base exchanging substance to another compartment by fluid means, in regenerating the zeolite by a chemical passed through it in the second compartment and in cleansing the base exchanging substance from the regenerating chemical preparatory to re-use of the base exchanging substance.

24. The process of utilizing base exchanging substances and regenerating it preparatory to another use, which consists in utilizing the base exchanging substance in a closed compartment for a base-exchanging run of liquid through the base exchanging substance, in forcing the base exchanging substance by fluid pressure upwardly out of the compartment, in subsequently regenerating and washing the base exchange substance, and in returning the base exchanging substance to the compartment in which it was first located for another run.

25. The process of using a base exchanging substance and regenerating and preparing it for a new use which consists in performing part of the process in one filtering compartment and in transferring the substance to another compartment for the completion of the process.

26. The process of water softening by the use of a base exchanging substance and regeneration and preparation for reuse which consists in performing part of the process in one compartment and part in a separate compartment and in transferring the substance from one compartment to the other by fluid means.

27. The process of utilizing base-exchanging substance and preparing it for another use which consists in utilizing the base-exchanging substance for a base-exchanging run of liquid through it, scouring the base-exchanging substance by attrition, regenerating the scoured base-exchanging substance and utilizing it for another run.

28. The process of utilizing base-exchanging substance and regenerating it preparatory to another use, which consists in utilizing the base-exchanging substance in a tank for a base-exchanging run of liquid through it, discharging the base-exchanging substance into the top of another tank containing liquid and regenerating in the other tank, and returning the base-exchanging substance to the first tank for another run.

29. The process of utilizing base-exchanging substance and regenerating it preparatory to another use, which consists in utilizing the base-exchanging substance for a base-exchanging run, discharging it into a regenerating liquid and at the same time scouring it, washing it and returning it to the point of first use for another run.

30. The process of utilizing base-exchanging substance and regenerating it preparatory to another use, which consists in utilizing the base-exchanging substance for a base-exchanging run of liquid through it in a tank, transferring the base-exchanging substance to another tank and at the same time scouring it, regenerating the base-exchanging substance in this other tank, and re-transferring the base-exchanging substance to the first tank for another run and at the same operation again scouring it.

In testimony whereof I have hereunto set my hand.

CARL H. NORDELL.